United States Patent
Pritchett et al.

(10) Patent No.: US 7,882,269 B2
(45) Date of Patent: *Feb. 1, 2011

(54) MODULARIZATION OF BROADCAST RECEIVER DRIVER COMPONENTS

(75) Inventors: Thaddeus C. Pritchett, Edmonds, WA (US); David A. Goll, Seattle, WA (US); Sean C. McDowell, Redmond, WA (US); Terje K. Backman, Carnation, WA (US); Jay Alan Borseth, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1184 days.

This patent is subject to a terminal disclaimer.

(21) Appl. No.: 11/000,611

(22) Filed: Dec. 1, 2004

(65) Prior Publication Data

US 2005/0097227 A1 May 5, 2005

Related U.S. Application Data

(63) Continuation of application No. 09/505,226, filed on Feb. 16, 2000, now Pat. No. 6,901,453.

(51) Int. Cl.
  *G06F 15/16* (2006.01)
  *H04N 5/44* (2006.01)
  *H03M 1/12* (2006.01)
(52) U.S. Cl. .................. 709/250; 709/208; 348/725; 348/572
(58) Field of Classification Search .............. 709/250, 709/208
  See application file for complete search history.

(56) References Cited

U.S. PATENT DOCUMENTS

| | | | | |
|---|---|---|---|---|
| 5,073,930 A | * | 12/1991 | Green et al. | 725/69 |
| 5,237,686 A | * | 8/1993 | Asano et al. | 718/105 |
| 5,331,634 A | * | 7/1994 | Fischer | 370/405 |
| 5,473,609 A | * | 12/1995 | Chaney | 370/312 |
| 5,625,845 A | | 4/1997 | Allran et al. | |
| 5,635,979 A | | 6/1997 | Kostreski et al. | |
| 5,768,539 A | * | 6/1998 | Metz et al. | 709/249 |
| 5,805,821 A | | 9/1998 | Saxena et al. | |
| 5,809,427 A | | 9/1998 | Perreault et al. | |
| 5,889,990 A | | 3/1999 | Coleman et al. | |
| 5,986,716 A | * | 11/1999 | Sokawa et al. | 348/553 |
| 6,023,730 A | | 2/2000 | Tani | |
| 6,085,236 A | | 7/2000 | Lea | |
| 6,157,411 A | | 12/2000 | Williams et al. | |
| 6,189,037 B1 | * | 2/2001 | Adams et al. | 709/230 |
| 6,205,485 B1 | * | 3/2001 | Kikinis | 709/231 |
| 6,212,566 B1 | | 4/2001 | Vanhoof et al. | |
| 6,286,037 B1 | | 9/2001 | Matsuura | |

(Continued)

FOREIGN PATENT DOCUMENTS

GB  2325805  12/1998

*Primary Examiner*—Vivek Srivastava
*Assistant Examiner*—Taylor Elfervig
(74) *Attorney, Agent, or Firm*—Lee & Hayes, PLLC (57) ABSTRACT

A modularized broadcast receiver driver architecture includes one or more control nodes, under control of a network module, that perform a series of one or more functions to receive a broadcast signal and extract content information from the signal. None of the multiple control nodes requires knowledge of the network type via which the signal is being received. Rather, a network module is aware of the network type and configures the control nodes to carry out their respective functions.

13 Claims, 6 Drawing Sheets

U.S. PATENT DOCUMENTS

| | | |
|---|---|---|
| 6,340,997 B1 | 1/2002 | Borseth |
| 6,356,945 B1 | 3/2002 | Shaw et al. |
| 6,363,434 B1 * | 3/2002 | Eytchison .................. 719/313 |
| 6,393,495 B1 * | 5/2002 | Flory et al. ................. 719/327 |
| 6,427,238 B1 | 7/2002 | Goodman et al. |
| 6,459,427 B1 | 10/2002 | Mao et al. |
| 6,553,479 B2 | 4/2003 | Mirsky et al. |
| 6,580,462 B2 * | 6/2003 | Inoue et al. .................. 348/460 |
| 2003/0167473 A1 * | 9/2003 | Klosterman et al. ......... 725/140 |
| 2004/0175120 A1 * | 9/2004 | Arsenault et al. ............. 386/83 |

* cited by examiner

MODULARIZATION OF BROADCAST RECEIVER DRIVER COMPONENTS

RELATED APPLICATIONS

This application is a continuation of U.S. patent application Ser. No. 09/505,226, filed on Feb. 16, 2000 now U.S. Pat. No. 6,901,453, entitled "Modularization of Broadcast Receiver Driver Components", listing T. C. Pritchett, David Goll, Sean McDowell, T. K. Backman and Jay Borseth as inventors, and is which assigned to the same assignee as the present application, which patent is hereby incorporated herein by reference. This application is also related to U.S. patent application Ser. No. 10/987,230, filed on Nov. 12, 2003, which is also a continuation of U.S. patent application Ser. No. 09/505,226.

TECHNICAL FIELD

This invention relates to broadcast program tuning. More particularly, the invention relates to modularization of broadcast receiver driver components.

BACKGROUND OF THE INVENTION

It has become common for a single video, audio, or data device to receive multimedia program content via a variety of different network types. For instance, a television may receive programming from one or more cable systems or satellite systems and also from terrestrial broadcast systems. More recent devices such as set-top boxes (STBs) and multimedia personal computers (PCs) are able to receive programming from cable systems, terrestrial broadcast systems, satellite systems, the Internet, etc.

A device receiving multimedia program content typically includes a receiver driver implemented in software that may work in conjunction with corresponding hardware to "tune" to a particular program (a particular channel, a particular file server, etc.). Various functions are carried out by the receiver driver in order to tune to a particular program depending on the nature of the network type. Examples of such functions include radio frequency (RF) tuning, demultiplexing, decrypting, etc.

Currently, each of the pieces of such receiver drivers that are responsible for carrying out the various functions for tuning to a particular program require significant knowledge of the network type being used to transmit the program content. For example, in the case of a digital satellite transmission, each of the various pieces would need to have significant knowledge of how the program content is embedded in the signal being transmitted from the digital satellite. Furthermore, each of the various pieces are typically required to have significant knowledge of the functions being performed by preceding and subsequent pieces.

A receiver is typically constructed from hardware modules that are manufactured by different companies. Currently, the manufacturer of a receiver must write a driver that controls each of these independently developed modules. This process often involves time consuming coordination with each of the manufacturers of the various hardware modules. Additionally, such drivers cannot readily adapt to changes in transmission content or format. For example, a broadcaster may desire to begin broadcasting five channel audio in addition to the two channel audio that is already being broadcast. Currently such a change would require new drivers for existing hardware, and may even require replacement of existing hardware.

The invention described below addresses these disadvantages, providing modularization of broadcast receiver driver components.

SUMMARY OF THE INVENTION

Modularization of broadcast receiver driver components is described herein. A broadcast receiver is composed of one or more component drivers. Each component driver includes one or more control nodes that perform a series of one or more functions to receive a broadcast signal and extract content information from the signal.

According to one aspect of the modularization architecture, a broadcast receiver is constructed by connecting multiple control nodes together in order to receive a broadcast signal and extract multimedia content information from the signal. None of the multiple control nodes requires knowledge of the network type via which the signal is being received. Rather, a network module is aware of the network type and configures the control nodes as necessary to carry out their respective functions.

According to another aspect of the modularization architecture, the broadcast receiver driver includes an interface that allows a network module to identify, from the driver, what control nodes are included in the driver and what additional interfaces those control nodes include. The network module can thus be developed independently of the broadcast receiver driver and can operate in conjunction with multiple different broadcast receiver drivers.

According to another aspect of the invention, additional control nodes can be included in the broadcast receiver driver to support unforeseen changes to the format of the received signal. As each control node is configured by the network module, changes can be made to the operation of the broadcast receiver driver subsequent to development of the driver in order to accommodate such unforeseen changes.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
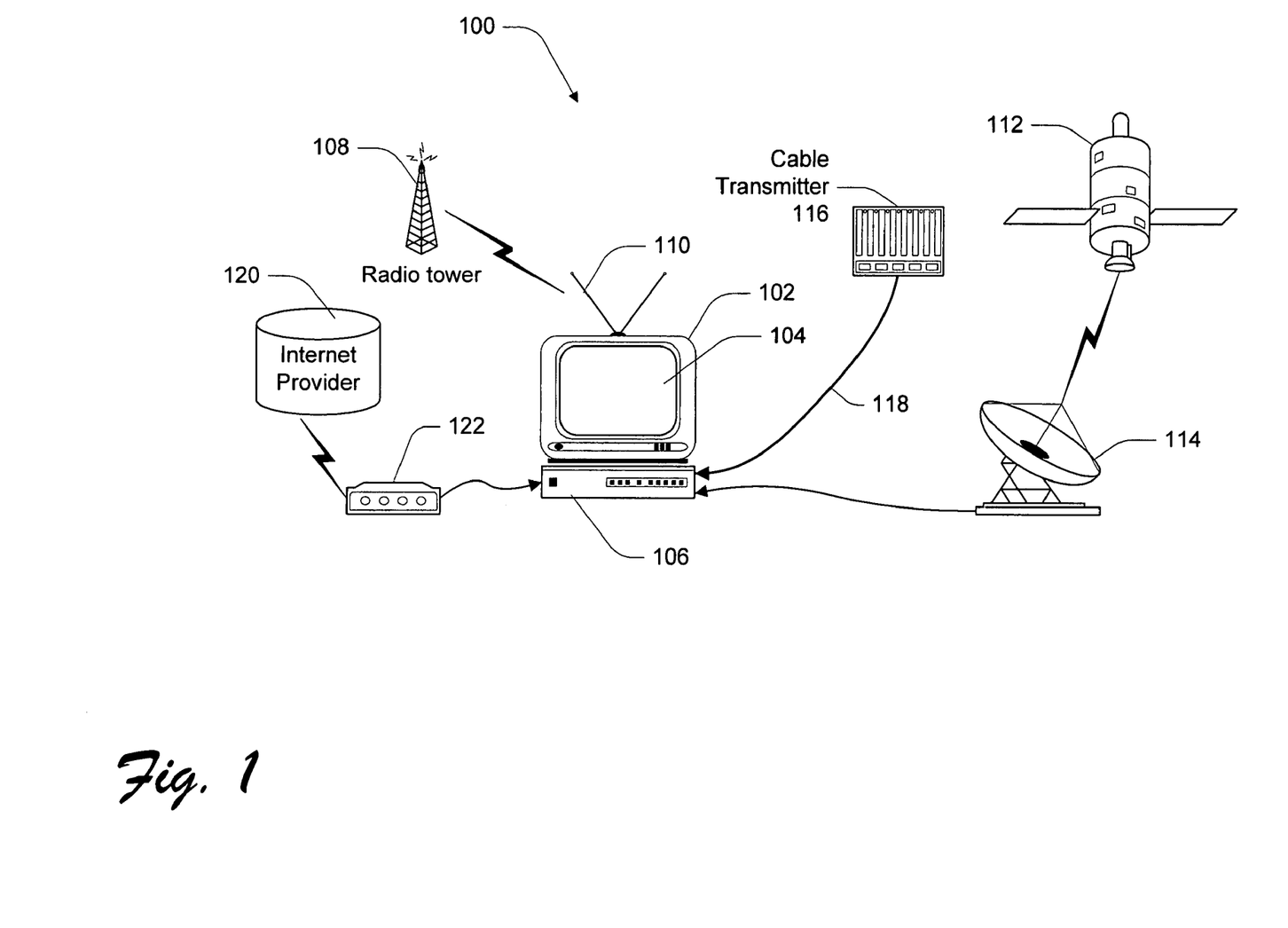
FIG. 1 shows an entertainment distribution and viewing system in accordance with one embodiment of the invention.

FIG. 1 shows an entertainment distribution and viewing system 100 in accordance with one embodiment of the invention. Entertainment system 100 includes a video and audio rendering system 102 having a display device including a viewing area 104. Video and audio rendering system 102 represents any of a wide variety of devices for playing video and audio content, such as a traditional television receiver, a personal computer, etc. Receiver 106 is connected to receive and render content broadcast from multiple different programming sources. Although illustrated as separate components, rendering system 102 may be combined with receiver 106 into a single component (e.g., a personal computer or television).

While audio and video have traditionally been transmitted using analog formats over the airwaves, current and proposed technology allows multimedia content transmission over a wider range of network types, including digital formats over the airwaves, different types of cable and satellite systems (employing both analog and digital transmission formats), wired or wireless networks such as the Internet, etc. Specific examples of network types include analog cable and terrestrial broadcast types (e.g., NTSC (National TV Standards Committee), SECAM (System En Couleur Avec Memoire), PAL (Phase Alternating Line)), digital cable and terrestrial broadcast types (e.g., ATSC (Advanced Television Systems Committee), DVB-T (Digital Video Broadcasting for digital terrestrial television), DVB-C (Digital Video Broadcasting for cable systems)), digital satellite (e.g., DVB-S (Digital Video Broadcasting for satellite services)), etc. Furthermore, many network types give a broadcaster flexibility as to what he or she includes in the signal (e.g., audio, video, or data information, specific languages, different camera angles, subtitles, etc.). The actual signal format can thus vary between broadcasters (or even during broadcasts from the same broadcaster) even though the network type remains the same.

FIG. 1 shows several different physical sources of programming, including a terrestrial television broadcasting system 108 which can broadcast analog or digital signals that are received by antenna 110; a satellite broadcasting system 112 which can transmit analog or digital signals that are received by satellite dish 114; a cable signal transmitter 116 which can transmit analog or digital signals that are received via cable 118; and an Internet provider 120 which can transmit digital signals that are received by modem 122. Both analog and digital signals can include audio, video, and/or data. Other programming sources might be used in different situations, including interactive television systems.

Each of these programming sources broadcasts or otherwise provides one or more content sources. The most familiar example of a content source is a traditional RF television broadcast channel, which is typically occupied by a particular broadcast network such as ABC, CBS, NBC, etc. In the last several years, a great number of such broadcast networks have become available through cable television providers. Each of these broadcast content sources is associated with a particular broadcast channel, which in turn is identified by a channel number. More recently, systems are being developed in which broadcast content sources are associated with channels that are identified by channel name. Broadcast content sources are described herein as being associated with "transport identifiers". A transport identifier identifies how a particular program can be received, such as by channel number, channel name, Internet Protocol (IP) address or file name, etc.

As described in more detail below, a modularized broadcast receiver driver architecture is used by rendering system 102 and/or receiver 106. The components of the receiver driver are implemented in a modularized fashion and controlled by an additional network module. This modularized architecture alleviates each of the individual receiver components from having significant knowledge of the network type via which the signal is being received.

Figure 2:
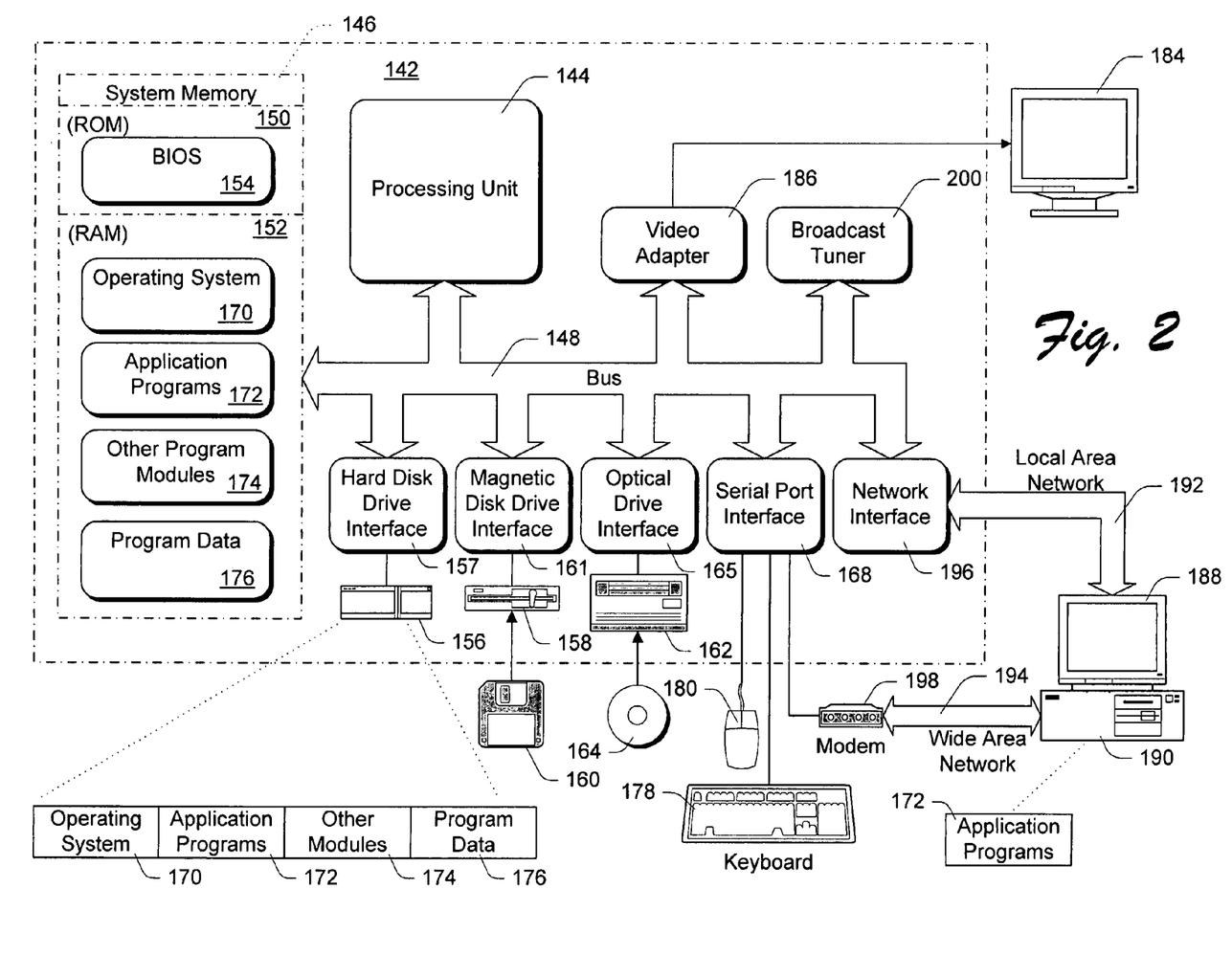
FIG. 2 shows a general example of a computer that can be used in accordance with the invention.

FIG. 2 shows a general example of a computer 142 that can be used in accordance with the invention. Computer 142 is shown as an example of a computer that can perform the functions of rendering system 102 and/or receiver 106 of FIG. 1. Computer 142 includes one or more processors or processing units 144, a system memory 146, and a system bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 also includes one or more broadcast tuners 200. Broadcast tuner 200 receives broadcast signals either directly (e.g., analog or digital cable transmissions fed directly into tuner 200) or via a reception device (e.g., via antenna 110 or satellite dish 114 of FIG. 1).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
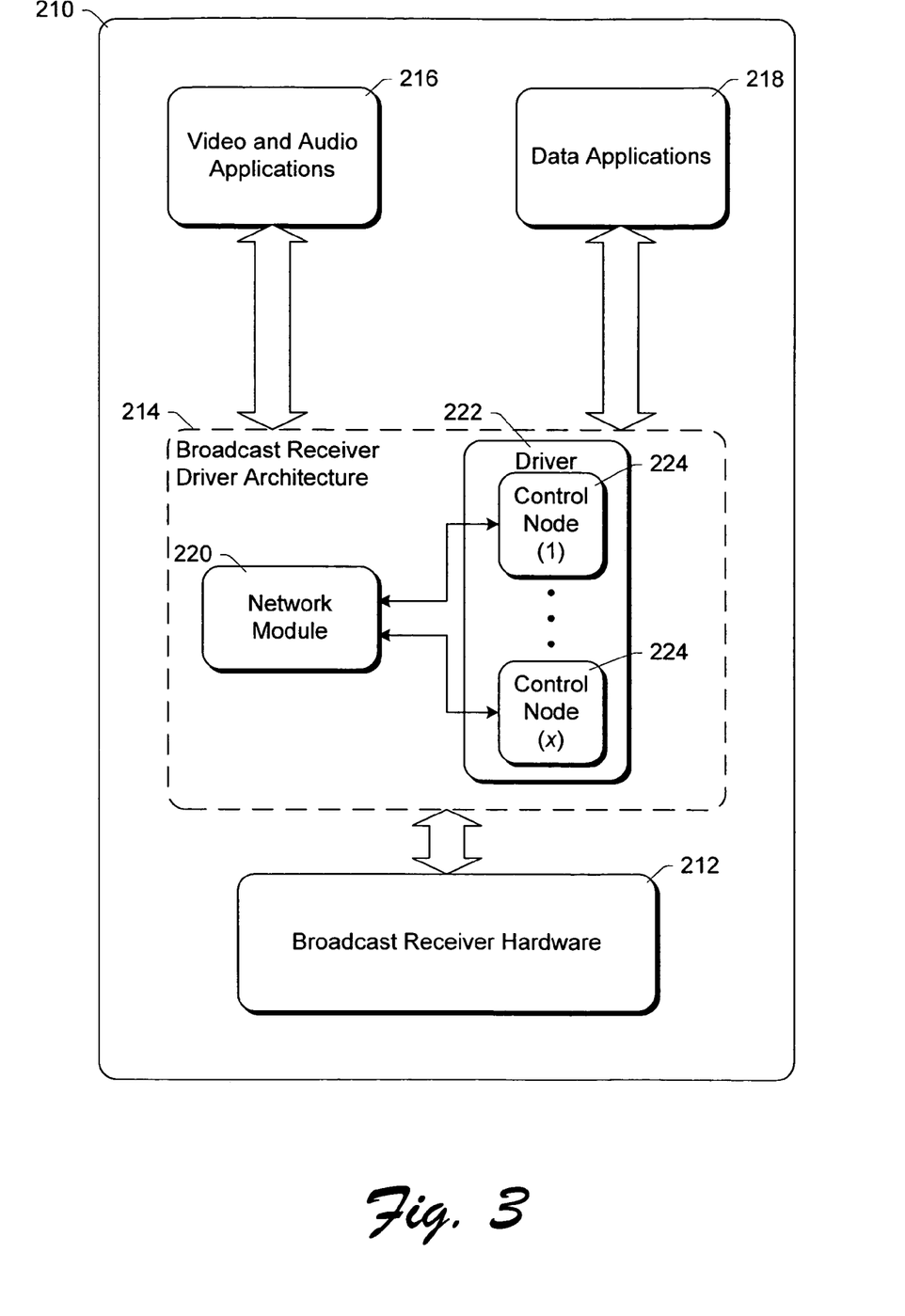
FIG. 3 is a block diagram illustrating an exemplary system for receiving and playing multimedia content.

FIG. 3 is a block diagram illustrating an exemplary system for receiving and playing multimedia content. A system 210 is illustrated including broadcast receiver hardware 212, broadcast receiver driver architecture 214, one or more video and/or audio applications 216, and one or more data applications 218. System 210 can be a rendering system 102 and/or receiver 106 of FIG. 1.

Broadcast receiver hardware 212 includes various hardware components for receiving, tuning, and extracting multimedia content from received signals. Broadcast receiver driver architecture 214 includes network module 220 (also referred to as a "network provider") and one or more broadcast receiver drivers 222 (also referred to as "filters", "device filters", or "components") each including one or more control nodes 224. Broadcast receiver driver architecture 214 can be implemented in software, firmware, hardware, or a combination thereof.

One or more of control nodes 224 are packaged together and distributed as a receiver driver 222. Each receiver driver 222 includes an interface that allows network module 220 to identify what control nodes 224 are in driver 222 and what additional interfaces those control nodes include. Alternatively, network module 220 may provide a registration interface which can be accessed by each of the control nodes 224 to identify themselves to network module 220 by registering with module 220. Thus, network module 220 and broadcast receiver driver 222 can be developed independently, and network module 220 can be used to control multiple different broadcast receiver drivers.

Hardware 212 is controlled by control nodes 224, each of which is responsible for performing a specific function in the signal reception and data extraction process. The number of control nodes 224 and their respective functions are dependent on the network type(s) driver 222 is intended to support (including future network types). Examples of such control nodes include: a signal range selector corresponding to the hardware (e.g., for antenna selection); a frequency selector to filter particular frequencies; a demodulator to translate analog signals into digital bit streams; a packager (or tuner capturer) to separate the digital stream into packets and perform Forward Error Correction (FEC); a stream selector (or demultiplexer) to select particular packets from the stream; a stream selection filter to perform additional filtering of packets; a stream decryptor to decrypt encrypted content; and an Ethernet packager to package packets into Ethernet frames.

The operation of control nodes 224 in turn is controlled by network module 220. Network module 220 is programmed with or otherwise has access to information describing the network type via which the signal is received, including the manner in which audio, video, and data information is embedded in the received signal. Network module 220 interfaces with the various control nodes 224 and programs them to perform their corresponding functions when necessary based on the network type. The attached appendix that forms part of this document describes example interfaces that are used by network module 220 and control nodes 224 in accordance with one implementation of the invention.

The interface(s) that is provided by a particular one of control nodes 224 is dependent on the specific functions carried out by that node. The basic functionality of each control node 224 is pre-determined and programmed into the control node. However, the specific manner in which that functionality is carried out is configurable by network module 220. For example: a frequency selector control node is pre-programmed with the basic functionality to filter frequencies, but the specific information of what frequency to tune is configurable by network module 220; a demodulator control node is pre-programmed with the basic functionality to translate analog signals into digital bit streams, but the specific information of what sampling rate is used to perform such translation is configurable by network module 220. Additional examples of control nodes 224 and their configurability are included in Table I below.

TABLE I

| Control Node | Examples of Configurable Functionality |
| --- | --- |
| signal range selector | Antenna orientation; LNB (Low Noise Block converter) select |
| packager | FEC (Forward Error Correction) type; Viterbi decoding rate; Packet size |
| stream selector | Stream identifier number |
| stream selection filter | Section Version number/CRC (Cyclic Redundancy Checking) parameters |
| decryptor | Decryption Algorithm and mode |
| Ethernet packager | Network Interface Address |

Video and audio information extracted from received signals is made available to video and audio applications 216 for playback. Similarly, data information extracted from received signals is made available to data applications 218 for presentation to a user or for other uses desired by data applications 218. Additionally, one or more of applications 216 or 218 may submit requests (referred to as "tune requests") to tune to a particular transport identifier to broadcast receiver driver 214. Such a tune request includes an identification of the transport identifier to be tuned to (e.g., the channel number, channel name, file name, etc.) as well as an indication of the network type. This information in the tune request is used by driver 214 to correctly tune to the requested transport identifier, as discussed in more detail below.

Information may also be made available to broadcast receiver driver 214 in the form of a "tuning space," which may be included in a tune request. A tuning space identifies a particular programming source (e.g., terrestrial broadcast, satellite, cable, Internet, etc.) as well as a network type for that programming source (e.g., NTSC, DVB-S, DVB-C, etc.). In the illustrated example, a tuning space is included as part of a received tune request, which may be received from an application 216 or 218 or elsewhere (e.g., from an electronic programming guide). The information for a tuning space allows control nodes 224 to be configured to extract data from the desired transport identifier, as discussed in more detail below.

In the illustrated example, broadcast receiver driver 214 can manage receiving a signal and extracting data from the signal from one or more programming sources concurrently. The number of programming sources that can be concurrently managed by driver 214 is dependent on the functions necessary to receive signals and extract data, and the number of control nodes 224 included in driver 214 to perform such functions. Additionally, multiple different instances of broadcast receiver driver 214 can be executing on system 210 concurrently, each being able to manage receiving a signal and extracting data from the signal from one or more programming sources concurrently.

Figure 4:
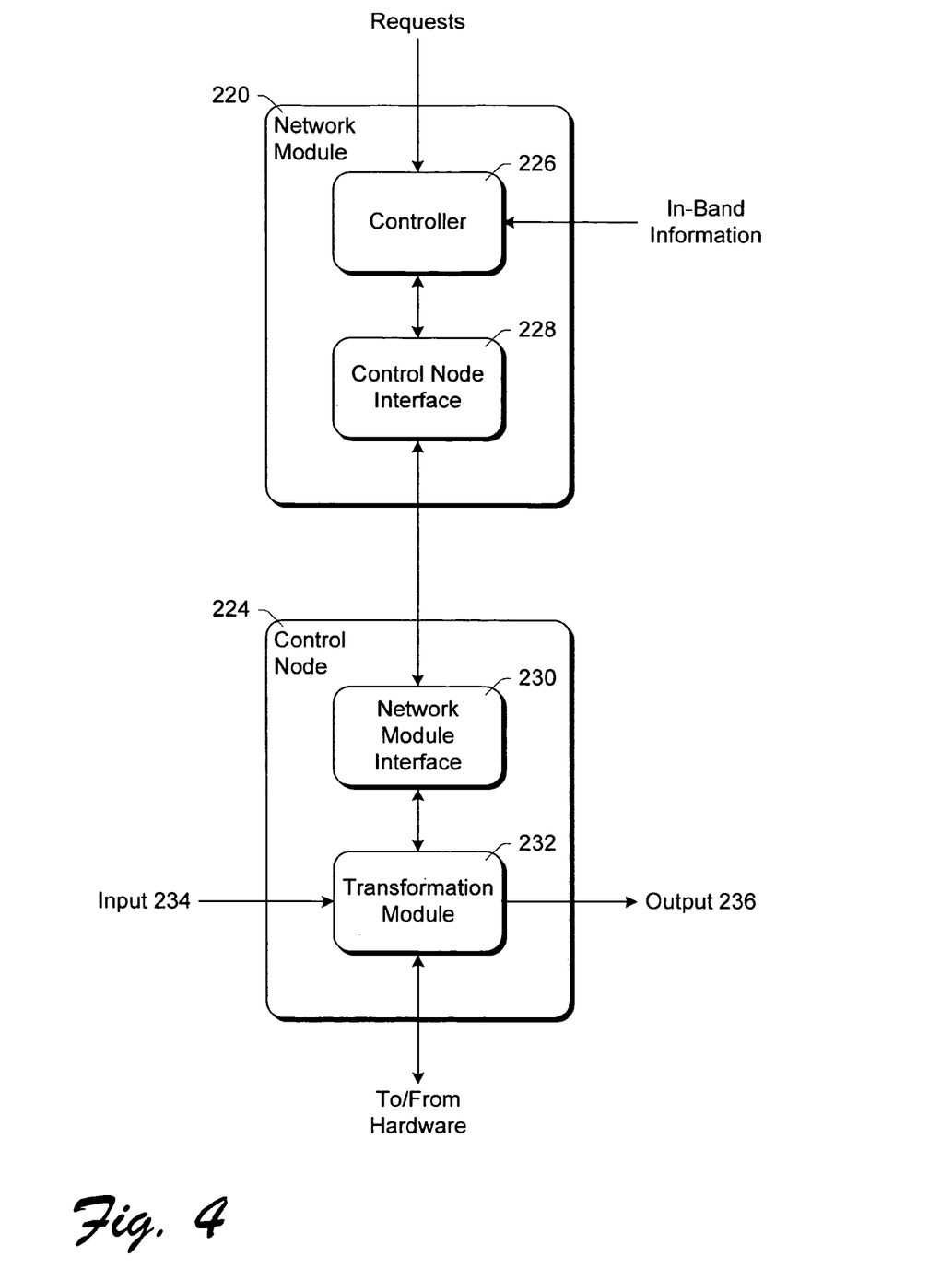
FIG. 4 is a block diagram illustrating an exemplary control node and network module in accordance with one embodiment of the invention.

FIG. 4 is a block diagram illustrating an exemplary control node and network module in accordance with one embodiment of the invention. Network module 220 includes a controller 226 and a control node interface 228. Controller 226 receives a request to tune to a particular transport identifier. Controller 226 uses information from or otherwise based on the request, in addition to possibly in-band information included in the signal corresponding to the transport identifier, to determine how to extract content information from the signal. The request itself may include information regarding how to extract content from a signal, or the transport identifier may be used to access a database from which information describing how to extract the content from the signal can be obtained. Controller 226 then communicates with control node 224 via control node interface 228 to configure control node 224 to carry out its respective function(s) in tuning to or extracting information from the signal.

Control node 224 includes a network module interface 230 and a transformation module 232. Network module interface 230 receives the configuration information from control node interface 228 and provides the information to transformation module 232. Transformation module 232 uses the configuration information to determine how to transform input 234 to generate output 236. Transformation module 232 continues to transform input 234 to output 236 in this same manner until new configuration information is received from network module 220 via network module interface 230.

Figure 5:
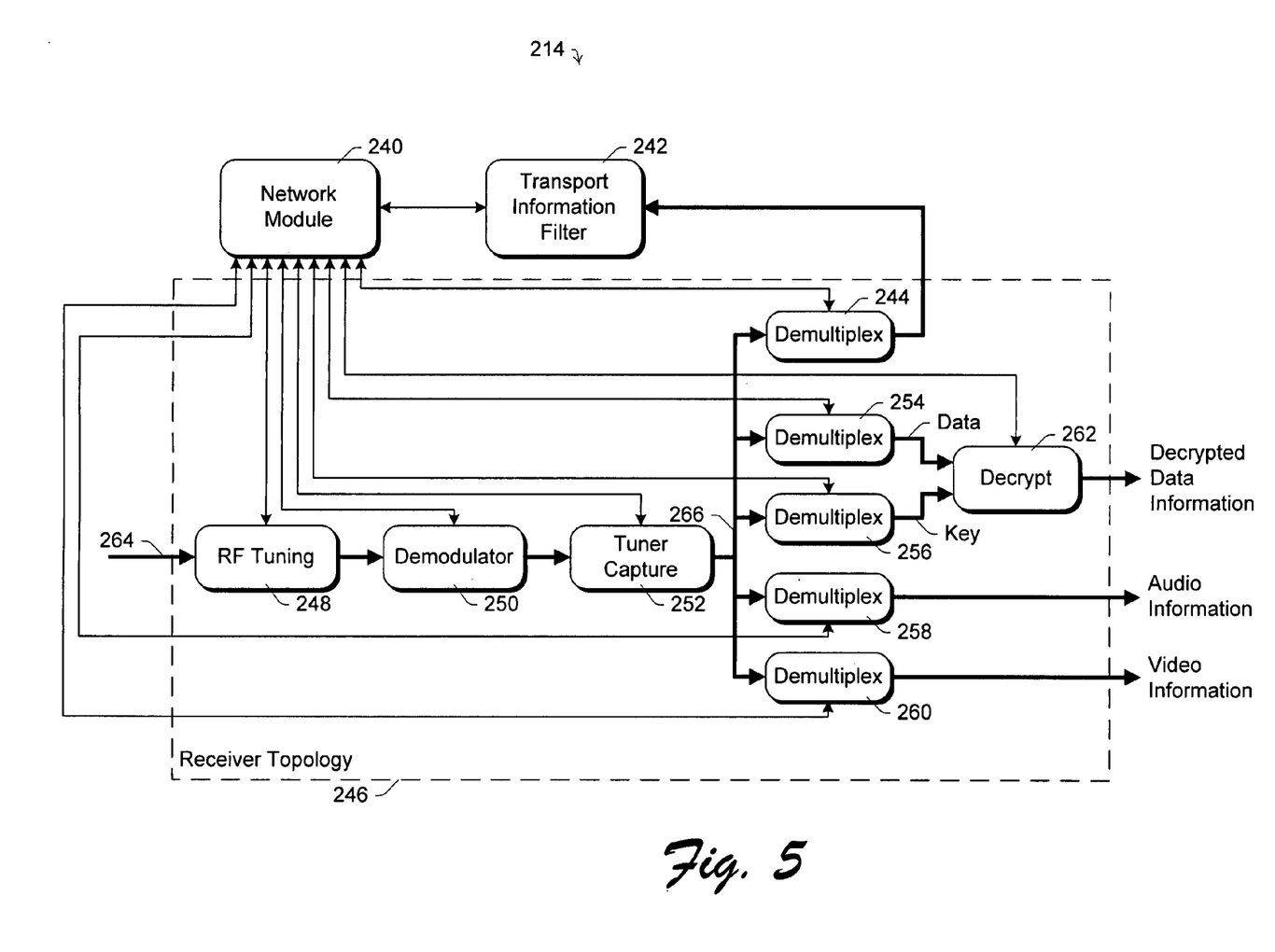
FIG. 5 is a block diagram illustrating an exemplary implementation of a broadcast receiver driver.

FIG. 5 is a block diagram illustrating an exemplary implementation of broadcast receiver driver architecture 214 of FIG. 3. In the exemplary implementation of FIG. 5, broadcast receiver driver architecture 214 is implemented in software, although architecture 214 could alternatively be implemented in other fashions.

Broadcast receiver driver architecture 214 includes a network module 240, a transport information filter 242, and multiple control nodes that are collectively referred to as a receiver topology 246. The control nodes of receiver topology 246 can be included in one or more drivers 222 of FIG. 3. The control nodes of receiver topology 246 include an RF tuning node 248, a demodulator node 250, a tuner capture node 252, multiple demultiplexer nodes 244, 254, 256, 258, and 260, and a decryption node 262. Additional control nodes may also be included in receiver topology 246, but have not been shown in order to avoid cluttering the drawing. The receiver topology 246 is merely exemplary—any of a wide range of receiver topologies can be used with the same, fewer, or additional control nodes than in receiver topology 246. Additionally, other receiver topologies may have the control nodes re-arranged (e.g., decryption node 262 may be before demultiplexer nodes 254, 256, 258, and 260).

An analog signal 264 is received by RF tuning node 248, which acquires the appropriate carrier frequency for signal 264 as identified by network module 240. This acquired signal is then input to demodulator node 250 which converts the analog signal into a digital form based on a sampling rate provided by network module 240. The digital signal is then input to tuner capture node 252 which generates packets of digital data and outputs these packets as digital stream 266. The manner in which packets are to be generated by node 252 (e.g., which bits in the stream received from demodulator node 250 to use, what type of Forward Error Correction to use, etc.) is provided by network module 240.

Digital stream 266 is input to each of the demultiplexer nodes 254-260. The demultiplexer nodes 254-260 are each programmed by network module 240 to extract and output selected packets (e.g., packets with particular packet IDs). In the illustrated example, demultiplexer 254 extracts packets for data information, demultiplexer 256 extracts decryption key information packets, demultiplexer 258 extracts audio information, and demultiplexer 260 extracts video information. Note that demultiplexers 254-260 are merely informed by network module 240 of what packets to extract (e.g., which packet IDs to look for and output). Demultiplexers 254-260 neither have nor require any description or knowledge of what type of information is in these extracted packets, what will be done with the extracted packets they output, or how the packets were generated.

The data information packets output from demultiplexer node 254 and the decryption key information packets are both input to decryption node 262. Decryption node 262 is informed by network module 240 that it will receive two streams of input packets, one of which is data to be decrypted and the other of which includes decryption key(s) to decrypt the data. Decryption node 262 uses these two inputs to generate an output of decrypted data information.

Once extracted, the audio and video information can be made available to video and audio applications 216 of FIG. 3. Similarly, the decrypted data information can be made available to data applications 218.

Thus, each of control nodes 248-262 is merely informed by network module 240 that it will be receiving an input(s) and how to transform that input to generate an output. The control nodes 248-262 neither have nor require any information about exactly what type of information the control nodes are processing, what steps were taken prior to the input to the control node, what is done with the output of the control node, etc.

Network module 240 uses a combination of the network type information it has available to it as well as possibly the information received from transport information filter 242 to control receiver topology 246 to extract the appropriate information from the received signal for the requested transport identifier. Many network types (particularly for digital transmissions) incorporate information describing the signal format for the network type in the transmitted signal itself (also referred to as in-band information). Transport information filter 242 uses this in-band information to identify to network module 240 how to extract various information from the received signal. For example, this in-band information may include a table, mapping packet IDs to particular types of information (e.g., packet ID #5 includes the audio information, packet ID#6 includes the video information, packet ID#7 includes the data information, packet ID#8 includes the decryption key information, etc.). Alternatively, information describing the signal format may be available to transport information filter 242 in other manners. For example, filter 242 may be pre-programmed with any such signal format information (e.g., the appropriate information for particular times of day), may access a database (either local or remote, such as via the Internet) to obtain such signal format information, may receive a separate signal (e.g., via the Internet) including such format information, etc.

Network module 240 has basic information available to it regarding the network type(s) that are supported by receiver topology 246. This basic information is sufficient to allow network module 240 to configure control nodes 248-252 to tune to a particular frequency and generate a data stream 266. This basic information is also sufficient to allow network module 240 to configure demultiplexer node 244 to extract the in-band signal information packets and output the packets to transport information filter 242. This basic information can be made available to network module 240 in a variety of different manners. In one implementation, the tune request that is provided to network module 240 includes the basic information. Alternatively, network module 240 may be pre-programmed with the basic information, or may access a database (e.g., an electronic programming guide) to obtain the basic information.

The various functions performed by control nodes 248-262 can vary during operation due to requested transport identifier changes. For example, network module 240 re-configures control nodes 248-262 each time a new transport identifier is requested. Different transport identifiers will be on different carrier frequencies, may include different information (e.g., may include audio information for multiple languages), etc. Control nodes 248-262 are re-configured by network module 240 as necessary each time a transport identifier change occurs.

Additionally, the functions performed by control nodes 248-262 may change during receipt of a particular transport identifier. A broadcaster may change the signal format for whatever reason (or even no reason at all) during transmission. For example, certain data information packets may be encrypted while others may not, the packet ID that corresponds to video information may be changed, audio information for an additional language may be added at a particular time, etc.

Changes made by a broadcaster during transmission of a signal are typically identified in the in-band information of the signal. Transport information filter 242 continually receives such in-band information and monitors it for any changes. When a change is detected, transport information filter 242 informs network module 240 of the change so that it can re-configure control nodes 248-262 as necessary.

The broadcast receiver driver 214 is robust and able to adapt to various changes by the broadcaster as well as to new unforeseen network types. As the control nodes 248-262 neither have nor require complete information about the network type of the received signal, they can be configured to operate appropriately by network module 240 for various network types. By way of example, receiver topology 246 may include multiple additional demultiplexer nodes (not shown) to be used to extract data packets for information not known at the time driver 214 is developed. However, once such data packets become known, their respective packet IDs can be supplied to the demultiplexer nodes by network module 240 and the appropriate information extracted, even though the information was unknown and even unforeseen by the manufacturer or designer of the demultiplexers or driver 214.

Figure 6:
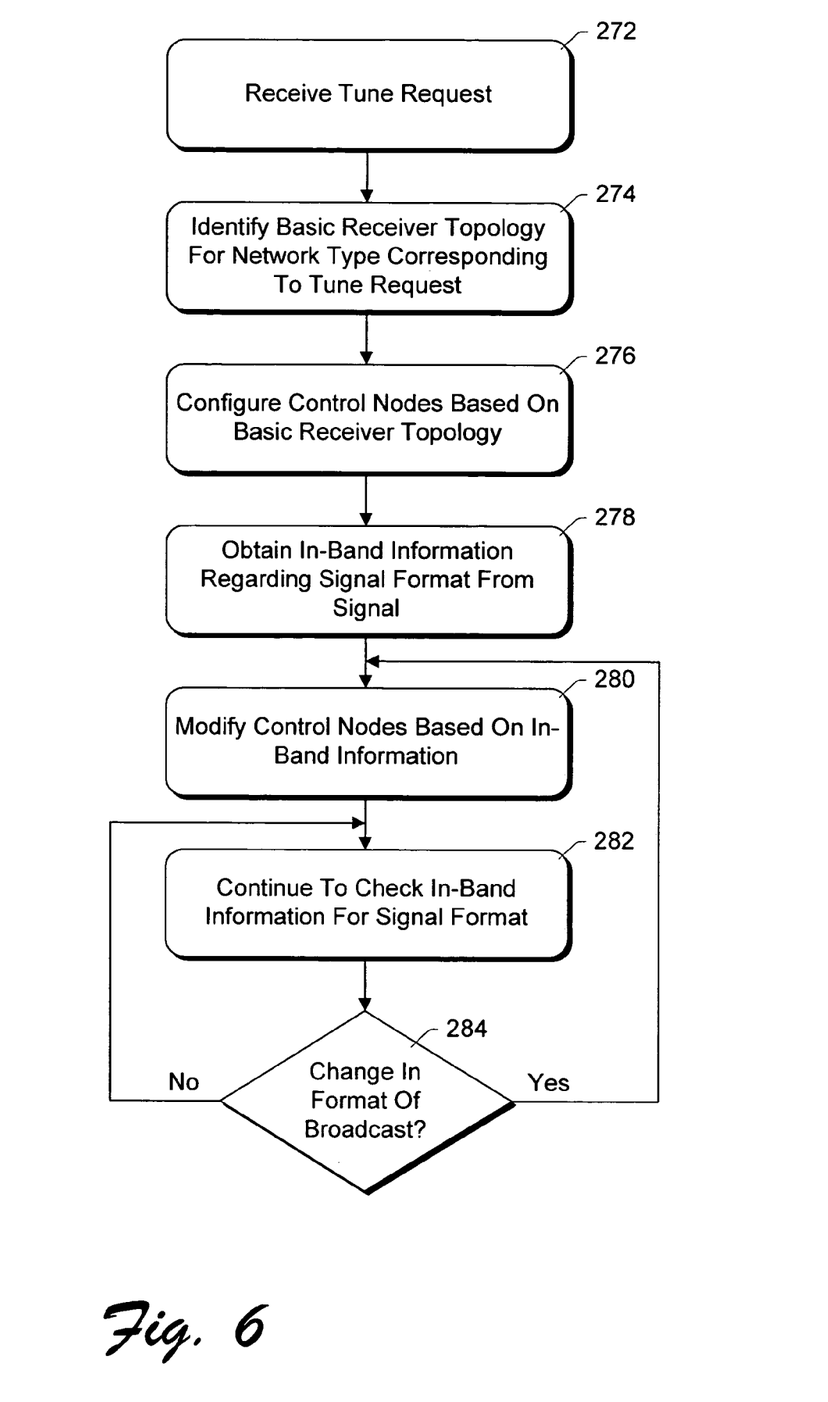
FIG. 6 is a flowchart illustrating an exemplary process for configuring the control nodes of a broadcast receiver driver.

FIG. 6 is a flowchart illustrating an exemplary process for configuring the control nodes of a broadcast receiver driver. The process of FIG. 6 is implemented by network module 240 and transport information filter 242 of FIG. 5, and may be performed in software. FIG. 6 is described with additional reference to elements of FIG. 5.

Initially, network module 240 receives a tune request (block 272). In response to the tune request, network module 240 identifies the basic receiver topology for the network type corresponding to the tune request (block 274). Network module 240 configures the control nodes 248, 250, and 252 and demultiplexer 244 based on the basic receiver topology (block 276). This basic configuration allows transport information filter 242 to receive packets including in-band from the signal regarding the signal format and provide such information to network module 240 (block 278).

Network module 240 uses this in-band information to modify the control nodes 248-262 as necessary in order to extract the information from the signal (block 280). Transport information filter 242 continues to check the in-band information from the signal (block 282), checking for any change in the signal format of the broadcast (block 284). If a change in the signal format of the broadcast occurs, then the changes are provided to network module 240, which in turn modifies the control nodes 248-262 as necessary based on the current signal format (block 280).

The broadcast receiver driver architecture described herein simplifies the development and implementation of broadcast receiver drivers and any corresponding hardware. By following the same standard interfaces, developers can design control nodes (and possibly corresponding hardware) that will function correctly when used with other control nodes of other developers.

Conclusion

Thus, a modularized broadcast receiver driver architecture has been described. A network module controls the individual control nodes that are used to tune to a signal and extract information from that signal. By centralizing control in the network module, the individual control nodes are advantageously alleviated of the burden of having any significant knowledge about the network type via which the signal is received.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
a network module, executed by a processor, to control extraction of information from a received signal broadcast in a first signal format, wherein the network module:
controls extraction of information based, at least in part, on the network type and on information regarding the first signal format;
configures at least a subset of a plurality of control nodes of one or more broadcast receiver drivers in accordance with a basic receiver topology for a network type via which the signal is received;
provides a registration interface which can be accessed by each of the control nodes to identify themselves to the network module,
monitors the received signal to detect a change in format of the received signal from the first signal format to a second signal format; and
a broadcast receiver driver, coupled to receive control from the network module, including a plurality of control nodes, wherein each control node:
performs a particular unique step of information extraction independent of what other steps other control are performing;
registers with the network module by accessing the registration interface;
and
includes an interface via which the network module can configure the control node to adjust the control node specific to the particular unique step of the information extraction the control node is performing; and
responsive to the network module detecting a change in format of the received signal from the first signal format, the network module configures an additional control node not previously utilized of the plurality of control nodes to extract information from the received signal broadcast in the second signal format.

2. A system as recited in claim 1, further comprising a transport information filter to extract information from the signal and make the extracted information available to the network module (FIG. 5, col. 6 ll. 50-67, col. 7 ll. 1-7).

3. A system as recited in claim 1, further comprising a transport information filter to extract information from the signal and make the extracted information available to the network module, wherein the network module is to control extraction of the information based at least in part on the information extracted by the transport information filter.

4. A system as recited in claim 1, wherein the broadcast receiver driver further includes an interface via which the network module can identify an interface on each of the plurality of control nodes.

5. A combined set of one or more broadcast receiver drivers, executed by a processor, comprising:
a network module to control extraction of information from a received signal;
a plurality of control nodes to receive an input that corresponds to a signal received via a network type, wherein:
each of the plurality of control nodes is chosen from a group consisting of:
a signal range selector corresponding to an antenna selection;
a radio frequency (RF) tuning node to filter particular radio frequencies;
a demodulator node to translate analog signals into digital streams;
a tuner capture node to separate the digital stream into packets and perform Forward Error Correction (FEC);
a plurality of demultiplexer nodes, wherein the plurality of demultiplexer nodes comprises:
a demultiplexer node to extract packets for data information packets wherein the data information packets are made available to a data application for presentation to a user;
a demultiplexer node to extract decryption key information packets;
a demultiplexer node to extract audio information; and
a demultiplexer node to extract video information;
a decryption node to receive a first stream of input packets containing data to be decrypted and a second stream of input packets containing a decryption key to decrypt the data of the first stream of input packets, wherein the network module informs the decryption node which stream contains data and which stream contains the decryption key;
an Ethernet packager to package packets into Ethernet frames;
a stream selection filter to perform additional filtering of packets;
each control node performs a particular unique operation of information extraction from the signal independent of operations other control nodes are performing and each control node further performs a specific function, the control node comprising;
a transformation module to transform the input to an output independent of the network type
a network module interface to receive, from a network module, configuration information for use by the transformation module in transforming the input to the output.

6. A control node as recited in claim 5, wherein one of the plurality of the control nodes further comprises a stream selector and wherein the configuration information comprises an identification of packets in an input bit stream that are to be output by the stream selector.

7. A control node as recited in claim 5, wherein the network module interface includes a void transform interface via which the network module can instruct the plurality of the control nodes to stop receiving input.

8. A control node as recited in claim 5, wherein the network module interface includes a null transform interface via which the network module can instruct the plurality of the control nodes to provide an output identical to the input.

9. A control node as recited in claim 5, wherein the network module interface includes an auto tune frequency filter interface via which the network module can identify, as at least part of the configuration information, a frequency of a transponder, a polarity of the transponder, and a range of the transponder.

10. A control node as recited in claim 5, wherein the network module interface includes a frequency filter interface via which the network module can identify, as at least part of the configuration information, a center frequency of a carrier that should be locked.

11. A control node as recited in claim 5, wherein the network module interface includes a frequency filter interface via which the network module can identify, as at least part of the configuration information, a polarity of a carrier that should be locked.

12. A control node as recited in claim 5, wherein the control node is responsive to configuration information extracted from a signal format wherein the signal format was foreseen when the one or more broadcast receiver drivers associated with the control node was developed.

13. A control node as recited in claim 5, wherein the control node is responsive to configuration information extracted from a signal format wherein the signal format was unforeseen when the one or more broadcast receiver drivers associated with the control node was developed.

* * * * *